(12) United States Patent
Zhang et al.

(10) Patent No.: US 7,718,156 B2
(45) Date of Patent: May 18, 2010

(54) METHOD FOR MANUFACTURING CARBON NANOSTRUCTURES HAVING MINIMAL SURFACE FUNCTIONAL GROUPS

(75) Inventors: Cheng Zhang, Lawrenceville, NJ (US); Martin Fransson, Princeton, NJ (US); Bing Zhou, Cranbury, NJ (US)

(73) Assignee: Headwaters Technology Innovation, LLC, Lawrenceville, NJ (US)

( * ) Notice: Subject to any disclaimer, the term of this patent is extended or adjusted under 35 U.S.C. 154(b) by 258 days.

(21) Appl. No.: 11/614,011

(22) Filed: Dec. 20, 2006

(65) Prior Publication Data

US 2008/0152576 A1    Jun. 26, 2008

(51) Int. Cl.
C01B 31/00   (2006.01)
C01B 31/04   (2006.01)
C09C 1/44    (2006.01)
C09C 1/46    (2006.01)
B01J 21/18   (2006.01)

(52) U.S. Cl. .............. 423/445 R; 423/447.4; 423/447.5; 423/448; 502/180; 502/182

(58) Field of Classification Search ............. 423/445 B, 423/445 R, 447.1, 447.4, 447.5, 447.9, 448; 502/180, 182
See application file for complete search history.

(56) References Cited

U.S. PATENT DOCUMENTS

| | | | |
|---|---|---|---|
| 4,336,238 A | 6/1982 | Dalton, Jr. et al. | 423/584 |
| 4,347,231 A | 8/1982 | Michaelson | 423/584 |
| 4,347,232 A | 8/1982 | Michaelson | 423/584 |
| 4,374,105 A | 2/1983 | Anderson et al. | 423/230 |
| 5,296,543 A | 3/1994 | Kasowski et al. | |
| 5,462,680 A | 10/1995 | Brois et al. | |
| 5,591,312 A | 1/1997 | Smalley | 204/157.41 |
| 5,643,990 A | 7/1997 | Uehara et al. | 524/496 |

(Continued)

FOREIGN PATENT DOCUMENTS

JP    8325504    12/1996

(Continued)

OTHER PUBLICATIONS

Sun et al., "Colloidal Carbon Spheres and Their Core/Shell Structures with Noble-Metal Nanoparticles", Angewandte Chemie International Edition, Wiley-VCH Verlag GmbH & Co. KGaA, 2004, vol. 43, Issue 5, pp. 597-6501.

(Continued)

*Primary Examiner*—Scott Kastler
*Assistant Examiner*—Brian Walck
(74) *Attorney, Agent, or Firm*—Workman Nydegger

(57) ABSTRACT

Carbon nanostructures are formed from a carbon precursor and catalytic templating nanoparticles. Methods for manufacturing carbon nanostructures generally include (1) forming a precursor mixture that includes a carbon precursor and a plurality of catalytic templating particles, (2) carbonizing the precursor mixture to form an intermediate carbon material including carbon nanostructures, amorphous carbon, and catalytic metal, (3) purifying the intermediate carbon material by removing at least a portion of the amorphous carbon and optionally at least a portion of the catalytic metal, and (4) heat treating the purified intermediate carbon material and/or treating the purified intermediate carbon material with a base to remove functional groups on the surface thereof. The removal of functional groups increases the graphitic content of the carbon nanomaterial and decreases its hydrophilicity.

29 Claims, 6 Drawing Sheets

U.S. PATENT DOCUMENTS

| | | | |
|---|---|---|---|
| 5,830,326 A | 11/1998 | Iijima | 204/173 |
| 6,231,980 B1 | 5/2001 | Cohen et al. | 428/403 |
| 6,515,845 B1 | 2/2003 | Oh et al. | 361/502 |
| 6,551,960 B1 | 4/2003 | Laine et al. | 502/327 |
| 6,589,312 B1 | 7/2003 | Snow et al. | 75/245 |
| 6,673,953 B2 | 1/2004 | Keller et al. | 556/143 |
| 6,683,783 B1 | 1/2004 | Smalley et al. | 361/502 |
| 6,689,835 B2 | 2/2004 | Amarasekera et al. | 524/495 |
| 6,692,718 B1 | 2/2004 | Osawa | 423/448 |
| 6,712,864 B2 | 3/2004 | Horiuchi et al. | 23/314 |
| 6,756,026 B2 | 6/2004 | Colbert et al. | |
| 6,835,591 B2 | 12/2004 | Rueckes et al. | 438/99 |
| 6,866,801 B1 | 3/2005 | Mau et al. | 264/29.1 |
| 6,936,233 B2 | 8/2005 | Smalley et al. | |
| 2002/0192141 A1 | 12/2002 | Little | 423/447.3 |
| 2003/0004058 A1 | 1/2003 | Li et al. | 423/447.3 |
| 2003/0100653 A1 | 5/2003 | Chacko | 524/99 |
| 2003/0166762 A1 | 9/2003 | Koevoets et al. | 523/351 |
| 2003/0185741 A1 | 10/2003 | Matyjaszewski et al. | 264/29.2 |
| 2004/0005269 A1 | 1/2004 | Huang et al. | 423/447.3 |
| 2004/0047798 A1 | 3/2004 | Oh et al. | 423/445 R |
| 2004/0069454 A1 | 4/2004 | Bonsignore et al. | |
| 2004/0110005 A1 | 6/2004 | Choi et al. | 428/408 |
| 2004/0136894 A1 | 7/2004 | Yoshizawa et al. | 524/495 |
| 2004/0141906 A1 | 7/2004 | Polverejan et al. | 423/418.2 |
| 2004/0185251 A1 | 9/2004 | Wang et al. | 428/689 |
| 2004/0214177 A1 | 10/2004 | Bension | 435/6 |
| 2004/0224163 A1 | 11/2004 | Tobita et al. | 428/413 |
| 2004/0234444 A1 | 11/2004 | Shaffer et al. | |
| 2005/0009694 A1 | 1/2005 | Watts et al. | |
| 2005/0016839 A1 | 1/2005 | Horne et al. | 428/248.1 |
| 2005/0032635 A1 | 2/2005 | Yu et al. | |
| 2005/0037255 A1 | 2/2005 | Ozaki et al. | 429/128 |
| 2005/0039382 A1* | 2/2005 | Blanchard et al. | 44/362 |
| 2005/0049355 A1 | 3/2005 | Tang et al. | 524/496 |
| 2005/0070657 A1 | 3/2005 | Elkovitch et al. | 524/495 |
| 2005/0127782 A1 | 6/2005 | Endo et al. | 310/323.02 |
| 2005/0128884 A1 | 6/2005 | Endo et al. | 368/160 |
| 2005/0170169 A1 | 8/2005 | Watanabe et al. | 428/292.1 |
| 2005/0228109 A1 | 10/2005 | Chandra et al. | 524/495 |
| 2005/0245667 A1 | 11/2005 | Harmon et al. | 522/116 |
| 2006/0062712 A1 | 3/2006 | Pak et al. | |
| 2006/0133981 A1* | 6/2006 | Jaroniec et al. | 423/445 R |
| 2006/0137487 A1 | 6/2006 | McKinnon et al. | |

FOREIGN PATENT DOCUMENTS

| | | |
|---|---|---|
| JP | 2002338219 | 11/2002 |
| JP | 2003054922 | 2/2003 |
| JP | 2004339041 | 2/2004 |
| JP | 2004224579 | 8/2004 |
| JP | 2004331929 | 11/2004 |
| JP | 2004339407 | 12/2004 |
| JP | 2005074472 | 3/2005 |
| JP | 2005133047 | 5/2005 |
| WO | WO 2004087565 A1 * | 10/2004 |
| WO | WO2005089390 | 9/2005 |

OTHER PUBLICATIONS

Qiao et al., "Carbon nanospheres produced in an arc-discharge process", Carbon 44 (2006) 158-193, available online Sep. 13, 2005.

Garrigue et al., "Top-Done Approach for the Preparation of Colloidal Carbon Nanoparticles", Chemical Materials 2004, 16, 2984-2986, available online Jul. 17, 2007.

Li, et al., "Carbon Nanotubes as Support for Cathode Catalyst of a Direct Methanol Fuel Cell," Letters to the Editor/Carbon 40, Dalian University of Technology, pp. 791-794 (Jan. 18, 2002).

Li, et al., "Preparation and Characterization of Multiwalled Carbon Nanotube-Supported Platinum for Cathode Catalysts of Direct Methanol Fuel Cells," J. Phys. Chem, B, vol. 107, pp. 6292-6299 (Jun. 6, 2003).

Lordi, et al., "Method for Supporting Platinum on Single-Walled Carbon Nanotubes for a Selective Hydrogenation Catalyst," Chem. Mater., vol. 13, pp. 733-737 (Feb. 10, 2001).

Ohtsuka, Yasui, et al., "Char-Nitrogen Functionality and Interactions Between the Nitrogen and Iron I the Iron-Catalyzed Conversion Process of Coal Nitrogen to $N_2$," Research Center for Organic Resources and Materials Chemistry, Institute for Chemical Reaction Science, Tohoku University, Sendai, Japan, pp. 1356-1362 (May 6, 1998).

Matsumoto, et al., "Reduction of Pt usage in fuel cell electrocatalysts with carbon nanotube electrodes," Chem. Commun., The Royal Society of Chemistry 2004, 2004, pp. 840-841.

Li, et al., "Homogeneous and controllable Pt particles deposited on multi-wall carbon nanotubes as cathode catalyst for direct methanol fuel cells," Letters to the Editor/Carbon 42, Dalian University of Technology, pp. 436-439 (2004).

Han, Sangjin, et al., "Simple Solid-Phase Synthesis of Hollow Graphitic Nanoparticles and their Appliation to Direct Methanol Fuel Cell Electrodes," Adv. Mater. 2003, 15, No. 22, Nov. 17, pp. 1922-1925.

Hod, Oded, et al., "Carbon nanotube closed-ring structures", Physical Review, B 67, 195408 (2003).

Wang, Zhong L., et al., "A rich family of slinky materials," Materials Today, Apr. 2004, p. 7.

Zhen Liu, et al., "Formation of nanoparticles rings on heterogeneous soft surfaces," IOP Electronic Journals, Nanotechnology, 11 (Nov. 2004).

Bell, Linda, Editor/Publisher, Nanotech Briefs, vol. 1, No. 1, (Jan. 2004); www.nanotechbriefs.com.

Drzal, Lawrence T., "Nanotechnology Applications for Green Manufacturing," Michigan State University, College of Engineering, CMSC, Aug. 18, 2004.

Hester, J.R., et al., "Nanoparticle-templated carbon nanotube ring nucleus formation," Applied Physics Letters, (Apr. 8, 2002) vol. 80, No. 14, p. 2580-2.

Ibarra, M. R., "Magnetism of Nanometric 3d-Metal Particles in Carbon Cages: Possible Relevance for Biomedical Applications," presentation, Jun. 12, 2003.

Yong, K. Kim, et al., Nanocomposite Fibers, National Textile Center Annual Report: Nov. 2003; pp. 1-9.

Developing Application in Plastics, Nanotubes as a Conductive Additive in Elastomers; Hyperion Catalysis; http://www.fibrils.com/developing2.htm., Available as of at least Nov. 7, 2005.

Max Planck Research, Spicing up Styrene with Nano-Onions; Jan. 2003.

Bagci, V.M.K., "Metal nanoring and tube formation on carbon nanotubes", Dept. of Phys., Bilkent Univ., Ankara, Turkey, Jul. 18, 2002.

Kuznetsova, A., et al., Physical adsorption of xenon in open single walled carbon nanotubes: Observation of a quasi-one-dimensional confined Xe phase, Journal of Chemical Physics, vol. 112, No. 21, 9590-9598, Jun. 1, 2000.

Mawhinney, Douglas B., et al., "Infrared Spectral Evidence for the Etching of Carbon Nanotubes: Ozone Oxidation at 298 K", J. Am. Chem. Soc. (2000), 122, 2383-2384, published on web Feb. 29, 2000.

Kuznetsova, A., et al., "Enhancement of adsorption inside of single-walled nanotubes: opening the entry ports", Chemical Physics Letters 321, (2000), 292-296.

Kuznetsova, A., et al., "Oxygen-Containing Functional Groups on Single-Wall Carbon Nanotubes: NEXAFS and Vibrational Spectroscopic Studies", J. Am. Chem. Soc. (2001), 123, 10699-10704, published on web Oct. 9, 2001.

Fuertes, Antonio B. and Centeno, Teresa A., "Mesoporous carbons with graphitic structures fabricated by using porous silica materials as templates and iron-impregnated polypyrrole as precursor", J. Mater. Chem, (2005), 15, 1079-1083.

Guozhang, W., et al., "Entropy Penalty-Induced Self-Assembly in Carbon Black or Carbon Fiber Filled Polymer Blends", Macromolecules, (2002), vol. 35, No. 3, 945-951, published on the web Dec. 29, 2001.

Simonyan, Vahan V. and Johnson, J. Karl, "Hydrogen storage in carbon nanotubes and graphitic nanofibers", Journal of Alloys and Compounds, 330-332, (2002), 659-665.

Carmona, François and Ravier, Jérôme, "Electrical properties and mesostructure of carbon black-filled polymers", Pergamon, Carbon 40, (2002), 151-156.

Behler, K., et al., "Effect of thermal treatment on the structure of multi-walled carbon nanotubes", Journal of Nanoparticle Research, (2006), DOI 10/1007/s11051-006-9113-6.

Hyperion Catalysis, "Preservation of Physical Properties in Molded Parts Using Compounds with FIBRIL™ Nanotubes", Hyperion Catalysis International Inc. website www.hyperioncatalysis.com, Article available as of at least Nov. 2006.

* cited by examiner

METHOD FOR MANUFACTURING CARBON NANOSTRUCTURES HAVING MINIMAL SURFACE FUNCTIONAL GROUPS

BACKGROUND OF THE INVENTION

1. The Field of the Invention

The present invention relates generally to the manufacture of carbon nanostructures using templating nanoparticles. More particularly, the present invention relates to methods for manufacturing nanomaterials that include carbon nanostructures and have minimal surface functional groups.

2. The Related Technology

Carbon materials have been used in a variety of fields as high-performance and functional materials. Pyrolysis of organic compounds is well-known to be one of the most useful methods to prepare carbon materials. For example, carbon materials can be produced by pyrolyzing resorcinol-formaldehyde gel at temperatures above 600° C.

Most carbon materials obtained by pyrolysis of organic compounds at temperatures between 600-1400° C. tend to be amorphous or have a disordered structure. Obtaining highly crystalline or graphitic carbon materials can be very advantageous because of the unique properties exhibited by graphite. For example, graphitic materials can be conductive and form unique nanomaterials such as carbon nanotubes. However, using existing methods it is difficult to make these well-crystallized graphite structures using pyrolysis, especially at temperatures less than 2000° C.

To acquire the graphitic structure at lower temperature many studies have been carried out on carbonization in the presence of a metal catalyst. The catalyst is typically a salt of iron, nickel, or cobalt that is mixed with carbon precursor. Using catalytic graphitization, graphitic materials can be manufactured at temperatures between 600° C. and 1400° C.

Recently, this method has been used to manufacture hollow graphitic nanoparticles. The hollow graphitic nanoparticles are manufactured by forming a carbon precursor on iron nanoparticles and carbonizing the precursor. The iron nanoparticles and any amorphous carbon are removed from the hollow nanoparticles by treating the material with an acid and an oxidizing agent (e.g., potassium permanganate), respectively.

One problem with treating carbon nanomaterials with acid and/or an oxidizing agent is that the acid and/or oxidizing agent can generate functional groups on the surface of the carbon nanostructures and/or other graphitic materials mixed with the carbon nanostructures. Functional groups that can be introduced by acids and oxidizing agents include carboxylate groups, carbonyl groups, hydroxyl groups, ether groups, and hydronium groups. These functional groups can significantly affect the mechanical, chemical, and electrical properties of the carbon nanomaterial.

BRIEF SUMMARY OF THE INVENTION

The present invention relates to novel methods for manufacturing carbon nanostructures from a carbon precursor using catalytic metal templating nanoparticles. During the manufacturing process, the carbon nanostructures are produced as part of an intermediate carbon material that includes the carbon nanostructures and amorphous carbon. The intermediate carbon material is purified to remove amorphous carbon. It has been found that the purified intermediate material often have surface functional groups such as, but not limited to, carboxylic acids, hydroxyl groups, hydronium groups, or the like.

In the method of the invention, at least a portion of the functional groups are removed to give the nanomaterial desired properties. In one embodiment, the functional groups are removed by heating the purified intermediate carbon material. Alternatively or in addition to heating, the purified intermediate carbon material can be treated with a base to neutralize acidic groups. Removing all or a portion of the functional groups from the surface of the carbon nanomaterial can give the carbon nanomaterial beneficial properties including, but not limited to, improved dispersibility in hydrophobic materials and improved electrical conductivity.

In one embodiment, the method for manufacturing the carbon nanomaterial can be carried out in the following steps. A precursor mixture is formed that includes a carbon precursor and a plurality of templating nanoparticles. The templating nanoparticles include a catalytic metal (e.g., iron). The precursor mixture is carbonized (i.e., heated) to form an intermediate carbon material that includes a plurality of carbon nanostructures, amorphous carbon, and optionally catalytic metal. The intermediate carbon material is purified by removing at least a portion of the amorphous carbon and optionally a portion of remaining catalytic metal. The purified intermediate carbon material has a plurality of functional groups on its surface. At least a portion of the functional groups are removed from the surface of the purified intermediate carbon material by (i) heating the purified intermediate carbon material to a temperature greater than about 100° C. and/or (ii) treating the purified intermediate carbon material with a base.

In one embodiment of the invention, all or a portion of the nanostructures formed in the manufacturing process of the invention are nanospheres. The nanospheres are typically multi-walled hollow carbon nanostructures. The nanospheres can have a spheroidal shape and typically agglomerate to form a cluster that is also spheroidal or grape-like.

The carbon material manufactured according to the method of the invention can be nearly pure nanospheres and/or nanosphere clusters. Alternatively a portion of the carbon material can, be graphite sheets or other graphitic materials. The carbon nanomaterials can include non-graphitic amorphous carbon. However, it is typically advantageous to minimize the percentage of non-graphitic amorphous carbon by removing it during purification and/or by converting non-graphitic amorphous carbon to graphite during additional heat treatment steps.

The carbon nanostructures of the invention can have superior electrical and material properties compared to carbon nanotubes. For example, when mixed with a polymer, nanostructures including carbon nanospheres have significantly reduced electrical resistance compared to polymers that include the same weight percent of carbon nanotubes.

These and other advantages and features of the present invention will become more fully apparent from the following description and appended claims as set forth below.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXAMPLE EMBODIMENTS

I. Introduction and Definitions

Figure 1A:
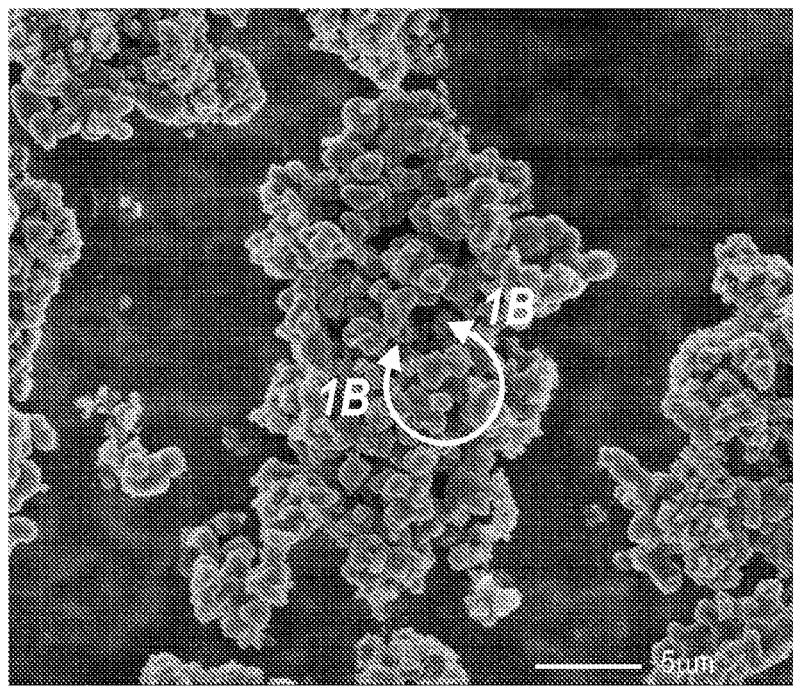
FIGS. 1A is a high resolution SEM image of a carbon nanomaterial formed according to an embodiment of the present invention, which includes a plurality of nanosphere clusters.

The present invention is directed to methods for manufacturing carbon nanostructures (e.g., carbon nanospheres) and purifying the carbon nanostructures by removing amorphous carbon and then removing functional groups (e.g., oxygen containing functional groups) that remain on the surface of the carbon material following the purification step and/or improving the purity of carbon nanostructures in the carbon nanomaterial.

The carbon nanostructures are formed from a carbon precursor and catalytic templating nanoparticles. Methods for manufacturing carbon nanostructures generally include (1) forming a precursor mixture that includes a carbon precursor and a plurality of catalytic templating particles, (2) carbonizing the precursor mixture to form and intermediate carbon material including carbon nanostructures, amorphous carbon, and catalytic metal, (3) purifying the intermediate carbon material by removing at least a portion of the amorphous carbon and optionally at least a portion of the catalytic metal, (4) heat treating the purified intermediate carbon material and/or treating the purified intermediate carbon material with a base to remove functional groups on the surface thereof.

The carbon nanostructures manufactured using the foregoing steps have one or more carbon layers forming a wall that generally appears to define a nanosphere. In one embodiment, the carbon nanostructure can be characterized as hollow but irregularly shaped multi-walled, sphere-like (or spheroidal) nanostructures when analyzed in view of SEM images in combination with TEM images of the same material. In one embodiment, the carbon nanostructures form clusters of grape-like structures as seen in SEM images but which are known to be hollow multi-walled nanostructures as shown by TEM images of the same material. For purposes of this invention, the term nanosphere includes graphitic, hollow particles or balls that have a regular or an irregular outer shape.

II. Components used to Manufacture Carbon Nanostructures

The following components can be used to carry out the above mentioned steps for manufacturing carbon nanostructures according to the present invention.

A. Carbon Precursor

Any type of carbon material can be used as the carbon precursor of the present invention so long as it can disperse the templating particles and carbonize around the templating particles upon heat treating. Suitable compounds include single and multi-ring aromatic compounds such as benzene and naphthalene derivatives that have polymerizable functional groups. Also included are ring compounds that can form single and multi-ring aromatic compounds upon heating. Functional groups that can participate in polymerization include COOH, C=O, OH, C=C, $SO_3$, $NH_2$, SOH, N=C=O, and the like.

The carbon precursor can be a single type of molecule (e.g., a compound that can polymerize with itself), or the carbon precursor can be a combination of two or more different compounds that co-polymerize together. For example, in an exemplary embodiment, the carbon precursor can be a resorcinol-formaldehyde gel. In this two compound embodiment, the formaldehyde acts as a cross-linking agent between resorcinol molecules by polymerizing with the hydroxyl groups of the resorcinol molecules.

Other examples of suitable carbon precursors include resorcinol, phenol resin, melamine-formaldehyde gel, poly (furfuryl alcohol), poly(acrylonitrile), sucrose, petroleum pitch, and the like. Other polymerizable benzenes, quinones, and similar compounds can also be used as carbon precursors and are known to those skilled in the art.

In an exemplary embodiment, the carbon precursor is a hydrothermally polymerizable organic compound. Suitable organic compounds of this type include citric acid, acrylic acid, benzoic acid, acrylic ester, butadiene, styrene, cinnamic acid, and the like.

B. Catalytic Templating Nanoparticles

The catalytic templating nanoparticles are used as a template for making the nanostructures. When mixed with the carbon precursor, the templating nanoparticles provide a nucleation site where carbonization and/or polymerization can begin or be enhanced. Because the templating nanoparticles are made from catalytic atoms, the templating particles can advantageously serve as both a nucleating site and as a catalyst for carbonization and/or polymerization.

The catalytic templating particles can be formed in more than one way. As described below, in one embodiment, the templating particles are formed from metal salts that agglomerate to form particles. Optionally, the catalyst atoms can be complexed with a dispersing agent to control formation of the particles. Templating nanoparticles formed using a dispersing agent tend to be more uniform in size and shape than templating particles formed without a dispersing agent.

1. Catalyst Atoms

The catalyst atom used to form the templating nanoparticles can be any material that can cause or promote carbonization and/or polymerization of the carbon precursor. In a preferred embodiment, the catalyst is a transition metal catalyst including but not limited to iron, cobalt, or nickel. These transition metal catalysts are particularly useful for catalyzing many of the polymerization and/or carbonization reactions involving the carbon precursors described above.

2. Dispersing Agents

Optionally, a dispersing agent can be complexed with the catalyst atoms to control formation of the templating nanoparticles. The dispersing agent is selected to promote the formation of nanocatalyst particles that have a desired stability, size and/or uniformity. Dispersing agents within the scope of the invention include a variety of small organic molecules, polymers 1and oligomers. The dispersing agent is able to interact and bond with catalyst atoms dissolved or dispersed within an appropriate solvent or carrier through various mechanisms, including ionic bonding, covalent bonding, Van der Waals interaction/bonding, lone pair electron bonding, or hydrogen bonding.

To provide the bonding between the dispersing agent and the catalyst atoms, the dispersing agent includes one or more appropriate functional groups. Preferred dispersing agents include functional groups which have either a charge or one or more lone pairs of electrons that can be used to complex a metal catalyst atom, or which can form other types of bonding such as hydrogen bonding. These functional groups allow the dispersing agent to have a strong binding interaction with the catalyst atoms.

The dispersing agent may be a natural or synthetic compound. In the case where the catalyst atoms are metal and the dispersing agent is an organic compound, the catalyst complex so formed may be an organometallic complex.

In an exemplary embodiment, the functional groups of the dispersing agent comprise one or more members selected from the group of a hydroxyl, a carboxyl, a carbonyl, an amine, an amide, a nitrile, a nitrogen with a free lone pair of electrons, an amino acid, a thiol, a sulfonic acid, a sulfonyl halide, or an acyl halide. The dispersing agent can be monofunctional, bifunctional, or polyfunctional.

Examples of suitable monofunctional dispersing agents include alcohols such as ethanol and propanol and carboxylic acids such as formic acid and acetic acid. Useful bifunctional dispersing agents include diacids such as oxalic acid, malic acid, malonic acid, maleic acid, succinic acid, and the like; dialcohols such as; ethylene glycol, propylene glycol, 1,3-propanediol, and the like; hydroxy acids such as glycolic acid, lactic acid, and the like. Useful polyfunctional dispersing agents include sugars such as glucose, polyfunctional carboxylic acids such as citric acid, pectins, cellulose, and the like. Other useful dispersing agents include ethanolamine, mercaptoethanol, 2-mercaptoacetate, amino acids, such as glycine, and sulfonic acids, such as sulfobenzyl alcohol, sulfobenzoic acid, sulfobenzyl thiol, and sulfobenzyl amine. The dispersing agent may even include an inorganic component (e.g., silicon-based).

Suitable polymers and oligomers within the scope of the invention include, but are not limited to, polyacrylates, polyvinylbenzoates, polyvinyl sulfate, polyvinyl sulfonates including sulfonated styrene, polybisphenol carbonates, polybenzimidizoles, polypyridine, sulfonated polyethylene terephthalate. Other suitable polymers include polyvinyl alcohol, polyethylene glycol, polypropylene glycol, and the like.

In addition to the characteristics of the dispersing agent, it can also be advantageous to control the molar ratio of dispersing agent to the catalyst atoms in a catalyst suspension. A more useful measurement is the molar ratio between dispersing agent functional groups and catalyst atoms. For example, in the case of a divalent metal ion two molar equivalents of a monovalent functional group would be necessary to provide the theoretical stoichiometric ratio. In a preferred embodiment, the molar ratio of dispersing agent functional groups to catalyst atoms is preferably in a range of about 0.01:1 to about 100:1, more preferably in a range of about 0.05:1 to about 50:1, and most preferably in a range of about 0.1:1 to 20:1.

The dispersing agents of the present invention allow for the formation of very small and uniform nanoparticles. In general, the nanocatalyst particles formed in the presence of the dispersing agent are less than 1 micron in size. Preferably the nanoparticles are less than 100 nm, more preferably less than 50 nm and most preferably less than 20 nm.

During pyrolysis of the carbon precursor, the dispersing agent can inhibit agglomeration and deactivation of the catalyst particles. This ability to inhibit deactivation can increase the temperature at which the nanocatalysts can perform and/or increase the useful life of the nanocatalyst in the extreme conditions of pyrolysis. Even if including the dispersing agent only preserves catalytic activity for a few additional milliseconds, or even microseconds, the increased duration of the nanocatalyst can be very beneficial at high temperatures, given the dynamics of carbonization.

3. Solvents and Other Additives

A solvent can optionally be used to prepare the catalyst atoms for mixing with the dispersing agent and/or the carbon precursor. The liquid medium in which the catalytic templating nanoparticles are prepared may contain various solvents, including water and organic solvents. Solvents participate in particle formation by providing a liquid medium for the interaction of catalyst atoms and dispersing agent. In some cases, the solvent may act as a secondary dispersing agent in combination with a primary dispersing agent that is not acting as a solvent. In one embodiment, the solvent also allows the nanoparticles to form a suspension. Suitable solvents include water, methanol, ethanol, n-propanol, isopropyl alcohol, acetonitrile, acetone, tetrahydrofuran, ethylene glycol, dimethylformamide, dimethylsulfoxide, methylene chloride, and the like, including mixtures thereof.

The catalyst composition can also include additives to assist in the formation of the nanocatalyst particles. For example, mineral acids and basic compounds can be added, preferably in small quantities (e.g., less than, 5 wt %). Examples of mineral acids that can be used include hydrochloric acid, nitric acid, sulfuric acid, phosphoric acid, and the like. Examples of basic compounds include sodium hydroxide, potassium hydroxide, calcium hydroxide, ammonium hydroxide, and similar compounds.

It is also possible to add solid materials to assist in nanoparticle formation. For example, ion exchange resins may be added to the solution during catalyst formation. Ion exchange resins can be substituted for the acids or bases mentioned above. Solid materials can be easy separated from the final iron catalyst solution or suspension using simple techniques such as centrifugation and filtration.

C. Reagents for Purifying Intermediate Carbon Materials

Various reagents can be used to remove amorphous carbon and/or the catalytic metals from the carbon nanostructures, thereby purifying the intermediate material. The purification can be carried out using any reagent or combination of reagents capable of selectively removing amorphous carbon (or optionally catalytic metal) while leaving graphitic material.

Reagents for removing amorphous carbon include oxidizing acids and oxidizing agents and mixtures of these. An example of a mixture suitable for removing amorphous carbon includes sulfuric acid, $KMnO_4$, $H_2O_2$, 5M or greater $HNO_3$, and aqua regia.

The catalytic metal can be removed using any reagent that can selectively dissolve the particular metal used as catalyst without significantly destroying the carbon nanostructures, which are graphitic. Nitric acid is an example of a reagent suitable for dissolving many base transition metals such as, but not limited to, iron, cobalt, and nickel. Other examples of suitable reagents include hydrogen fluoride, hydrochloric acid, and sodium, hydroxide.

III. Manufacturing Carbon Nanostructures

The carbon nanostructures of the present invention can be manufactured using all or a portion of the following steps: (i) forming a precursor mixture that includes a carbon precursor and a plurality of templating nanoparticles, (ii) allowing or causing the carbon precursor to polymerize around the catalytic templating nanoparticles, (iii) carbonizing the precursor mixture to form an intermediate carbon material that includes a plurality of nanostructures (e.g., carbon nanospheres), amorphous carbon, and catalytic metal, (iv) purifying the intermediate carbon material by removing at least a portion of the amorphous carbon and optionally a portion of the catalytic metal, and (v) removing at least a portion of any functional groups that remain on the surface of the purified intermediate carbon material by heat treating the purified intermediate material and/or treating the purified intermediate material with a base.

A. Forming a Precursor Mixture

The precursor mixture is formed by selecting a carbon precursor and dispersing a plurality of catalytic templating nanoparticles in the carbon precursor.

The catalytic templating nanoparticles, which are dispersed in the carbon precursor, can be provided in several different ways. The templating nanoparticles can be formed in the carbon precursor (i.e., in-situ) or formed in a separate reaction mixture and then mixed with the carbon precursor. In some cases, particle formation may partially occur in a separate reaction and then be completed as the templating particles are mixed and/or heated in the carbon precursor (e.g., at the onset of a precursor polymerization step). The templating nanoparticles can also be formed using a dispersing agent that controls one or more aspects of particle formation or the templating nanoparticles can be made from metal salts.

In one embodiment, the templating nanoparticles are formed in the carbon precursor from a metal salt. In this embodiment, the templating nanoparticles are formed by selecting one or more catalyst metal salts that can be mixed with the carbon precursor. The metal salts are mixed with the carbon precursor and then allowed or caused to form nanoparticles in-situ.

In a more preferred embodiment, the templating particles are formed (in-situ or ex-situ) using a dispersing agent to control particle formation. In this embodiment, one or more types of catalyst atoms and one or more types of dispersing agents are selected. Next, the catalyst atoms (e.g., in the form of a ground state metal or metal salt) and dispersing agent (e.g., in the form of a carboxylic acid or its salt) are reacted or combined together to form catalyst complexes. The catalyst complexes are generally formed by first dissolving the catalyst atoms and dispersing agent in an appropriate solvent and then allowing the catalyst atoms to bond with the dispersing agent molecules. The various components may be combined or mixed in any sequence or combination. In addition, a subset of the components can be premixed prior to addition of other components, or all components may be simultaneously combined.

In an embodiment of the invention, the components for the templating nanoparticles are allowed or caused to form nanoparticles by mixing the components for a period of about 1 hour to about 14 days. This mixing is typically conducted at temperatures ranging from 0° C. to 200° C. In one embodiment, the temperature does not exceed 100° C. Particle formation can also be induced using a reagent. For example, in some cases formation of particles or intermediate particles can be caused by bubbling hydrogen through the solution of catalyst complexes.

The templating nanoparticles of the present invention are capable of catalyzing polymerization and/or carbonization of the carbon precursor. The concentration of catalytic templating nanoparticles in the carbon precursor is typically selected to maximize the number of carbon nanostructures formed. The amount of catalytic templating particles can vary depending on the type of carbon precursor being used. In an example embodiment the molar ratio of carbon precursor to catalyst atoms is about 0.1:1 to about 100:1, more preferably about 1:1 to about 30:1.

B. Polymerizing the Precursor Mixture

The precursor mixture is typically allowed to cure for sufficient time such that a plurality of intermediate carbon nanostructures are formed around the templating nanoparticles. Because the templating nanoparticles are catalytically active, the templating nanoparticles can preferentially accelerate and/or initiate polymerization of the carbon precursor near the surface of the templating particles.

The time needed to form intermediate nanostructures depends on the temperature, the type and concentration of the catalyst material, the pH of the solution, and the type of carbon precursor being used. During polymerization, the intermediate carbon nanostructures can be individual organic structures or an association of nanostructures that break apart during carbonization and/or removal of amorphous carbon.

Ammonia added to adjust the pH can also effect polymerization by increasing the rate of polymerization and by increasing the amount of cross linking that occurs between precursor molecules.

For hydrothermally polymerizable carbon precursors, polymerization typically occurs at elevated temperatures. In a preferred embodiment, the carbon precursor is heated to a temperature of about 0° C. to about 200° C., and more preferably between about 25° C. to about 120° C.

An example of a suitable condition for polymerization of resorcinol-formaldehyde gel (e.g., with iron particles and a solution pH of 1-14) is a solution temperature between 0° C. and 90° C. and a cure time of less than 1 hour to about 72 hours. Those skilled in the art can readily determine the conditions necessary to cure other carbon precursors under the same or different parameters.

In one embodiment the polymerization is not allowed to continue to completion. Terminating the curing process before the entire solution is polymerized can help to form a plurality of intermediate nanostructures that will result in individual nanostructures, rather than a single mass of carbonized material. However, the present invention includes embodiments where the carbon precursor forms a plurality of intermediate carbon nanostructures that are linked or partially linked to one another. In this embodiment, individual nanostructures are formed during carbonization and/or during the removal of amorphous carbon.

Forming intermediate carbon nanostructures from the dispersion of templating nanoparticles causes formation of a plurality of intermediate carbon nanostructures having unique shapes and sizes. Ultimately, the properties of the nanostructure can depend at least in part on the shape and size of the intermediate carbon nanostructure. Because of the unique shapes and sizes of the intermediate carbon nanostructures, the final nanostructures can have beneficial properties such as high surface area and high porosity, among others.

C. Carbonizing the Precursor Mixture

The precursor mixture is carbonized by heating to form an intermediate carbon material that includes a plurality of carbon nanostructures, amorphous carbon, and catalyst metal. The precursor mixture can be carbonized by heating the mixture to a temperature between about 500° C. and about 2500° C. During the heating process, atoms such as oxygen and nitrogen are volatilized or otherwise removed from the intermediate nanostructures (or the carbon around the templating nanoparticles) and the carbon atoms are rearranged or coalesced to form a carbon-based structure.

The carbonizing step typically produces a graphite based nanostructure. The graphite based nanostructure has carbon atoms arranged in structured sheets of $sp^2$ hybridized carbon atoms. The graphitic layers can provide unique and beneficial properties, such as electrical conduction and structural strength and/or rigidity.

D. Purifying the Intermediate Carbon Material

The intermediate carbon material is purified by removing at least a portion of non-graphitic amorphous carbon. This purification step increases the weight percent of carbon nanostructures in the intermediate carbon material.

The amorphous carbon is typically removed by oxidizing the carbon. The oxidizing agents used to remove the amorphous carbon are selective to oxidation of the bonds found in non-graphitic amorphous carbon but are less reactive to the pi bonds of the graphitic carbon nanostructures. The amorphous carbon can be removed by applying the oxidative agents or mixtures in one or more successive purification steps.

Optionally substantially all or a portion of the catalytic metals can be removed. Whether the catalytic metal is removed and the purity to which the catalytic metal is removed will depend on the desired use of the carbon nanomaterial. In some embodiments of the invention, the presence of a metal such as iron can be advantageous for providing certain electrical properties and/or magnetic properties. Alternatively, it may be desirable to remove the catalytic metal to prevent the catalytic metal for having an adverse affect on its ultimate use. For example, it can be advantageous to remove the metal if the carbon nanostructures are to be used as a catalyst support material for a fuel cell. Removing the catalytic templating particles can also improve the porosity and/or lower its density.

Typically, the templating nanoparticles are removed using acids or bases such as nitric acid, hydrogen fluoride, or sodium hydroxide. The method of removing the templating nanoparticles or amorphous carbon depends on the type of templating nanoparticle or catalyst atoms in the composite. Catalyst atoms or particles (e.g., iron particles or atoms) can typically be removed by refluxing the composite nanostructures in 5.0 M nitric acid solution for about 3-6 hours.

Any removal process can be used to remove the templating nanoparticles and/or amorphous carbon so long as the removal process does not completely destroy the carbon nanostructures. In some cases it may even be beneficial to at least partially remove some of the carbonaceous material from the intermediate nanostructure during the purification process.

During the purification process, the oxidizing agents and acids have a tendency to introduce hydronium groups and oxygenated groups such as, but not limited to, carboxylates, carbonyls, and/or ether groups to the surface of the carbonaceous materials. It is believed that the functional groups may be on the surface of the carbon nanostructures, graphite mixed with the carbon nanostructures, and/or remaining non-graphitic amorphous carbon.

E. Removing and/or Neutralizing Functional Groups from the Surface of the Intermediate Carbon Material The functional groups on the surface of the intermediate carbon material can be removed using a heat treatment step. The heat treatment step can be beneficially carried out at a selected temperature, which is selected depending on the particular functional groups that need to be removed. Generally, the higher the temperature of the heat treatment, the more types of functional groups that can be removed. The heat treatment step following purification can be carried out at a temperature greater than about 100° C., more preferably greater than about 200° C. and most preferably greater than about 500° C.

Optionally, the heat treatment following purification can be at a temperature sufficient to carry out carbonization of amorphous carbon. Surprisingly, heating the intermediate carbon material to a carbonizing temperature after purification can beneficially convert a significant portion of any remaining amorphous carbon to graphite. It has been found that by removing a significant percentage of amorphous carbon in the purification step and then carbonizing the purified material, the remaining carbon can be more easily converted to graphite.

The graphite formed in this second carbonization step can be added to the carbon nanostructures, the secondary structure of carbon nanostructures (e.g., the grape-like agglomerations of nanospheres), or can be free graphite mixed with the carbon nanostructures. Converting residual amorphous carbon to graphite significantly increases the graphitic purity of the carbon nanomaterial. High purity carbon nanomaterials can be produced more efficiently using the two step carbonization method of the invention compared to attempts to achieve the same level of purity in a single carbonization step.

In an alternative embodiment or in addition to the additional heat treatment step, some functional groups, such as but not limited to hydronium groups, can be removed from the intermediate carbon material using a neutralizing base. In this embodiment, the intermediate carbon material is mixed with a solution that includes one or more neutralizing bases. Suitable bases include hydroxides, including sodium hydroxide and potassium hydroxide, ammonia, Li-acetate, Na-acetate, K-acetate, $NaHCO_3$, $KHCO_3$, $Na_2CO_3$, $K_2CO_3$, and the like, and combinations of these. The reaction of the base with the hydronium group can form byproducts that can be removed by washing with water.

In one embodiment, functional groups are removed by soaking the intermediate carbon material in a washing solution. Additional base can be added to the washing solutions until the pH reaches a desired, more neutral pH. In one embodiment, the washing solution is neutralized to a pH in a range from about 5.0 to about 8.0, or alternatively in a range from about 6.0 to about 7.5.

The step to remove functional groups from the carbon nanomaterial may be used to remove functional groups for the carbon nanostructures, amorphous carbon (graphitic or non-graphitic) or any other component of the purified intermediate carbon material. In one embodiment, the functional groups are removed from the carbon nanostructures or other graphitic materials that form part of the carbon nanomaterial. A high temperature heat treating step can also be beneficial if it is desirable to remove certain impurities such as iron, in addition to removing functional groups from the nanomaterials.

IV. Carbon Nanostructures

The methods of the present invention produce a carbon nanomaterial having multi-walled carbon nanostructures. The carbon nanostructures within the carbon nanomaterial have useful properties such as unique shape, size, and/or electrical properties. The absence of some or substantially all the functional groups on the surface of the carbon nanomaterial is believed to be responsible for at least some of the beneficial and novel properties of the carbon nanomaterials of the invention. For example, carbon nanomaterials having reduced functional groups have shown improved dispersibility in many organic polymers.

The carbon nanostructures of the invention are particularly advantageous for some applications where high porosity, high surface area, and/or a high degree of graphitization are desired. Carbon nanostructures manufactured as set forth herein can be substituted for carbon nanotubes, which are typically more expensive to manufacture.

The carbon nanostructures can be regular or irregularly shaped spheroidal structures. The size and shape of the nanostructure is determined in large part by the size and shape of the templating nanoparticles used to manufacture the carbon nanostructures. Because the carbon nanostructures form around the templating nanoparticles, the hole or inner diameter of the carbon nanostructures typically corresponds to the outer diameter of the templating nanoparticles. The inner diameter of the carbon nanostructures can be between 0.5 nm to about 90 nm. For certain applications such as fuel cells, the inner diameter is preferably between about 1 nm and about 50 nm.

The carbon nanomaterials of the invention can be characterized by their weight percent of carbon nanostructures. The weight percent of carbon nanostructures (e.g., nanospheres) in the carbon nanomaterial can be greater than 60%, more, preferably greater than 80%, and most preferably greater than 90%.

Alternatively, or in addition to the weight percent of carbon nanostructure, the novel carbon nanomaterials can be characterized by the absence of surface functional groups. In one embodiment, the functionalization of the carbon nanomaterial is determined by the acidity of an aqueous wash. In one embodiment, the carbon nanomaterials have an acid functionalization that gives a wash solution a pH in a range from about 5.0 to about 8.0, more preferably about 6.0 to about 7.5, and most preferably in a range from about 6.5 to about 7.25, based on a 1:1 weight ratio of washing solution to carbon nanomaterial. These pH ranges can be achieved in carbon nanomaterials that have been treated with a base, heat treated, or both.

Figure 1B:
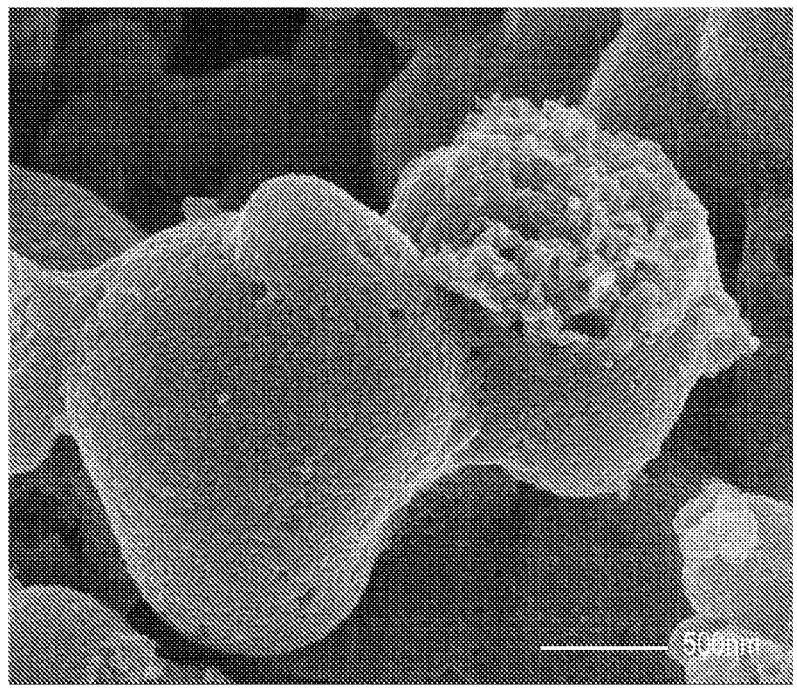
FIG. 1B is a high resolution, SEM image showing a closer image of individual clusters of carbon nanostructures and showing one cluster that has been broken open to reveal the plurality of carbon nanostructures that make up the cluster.
Figure 2:
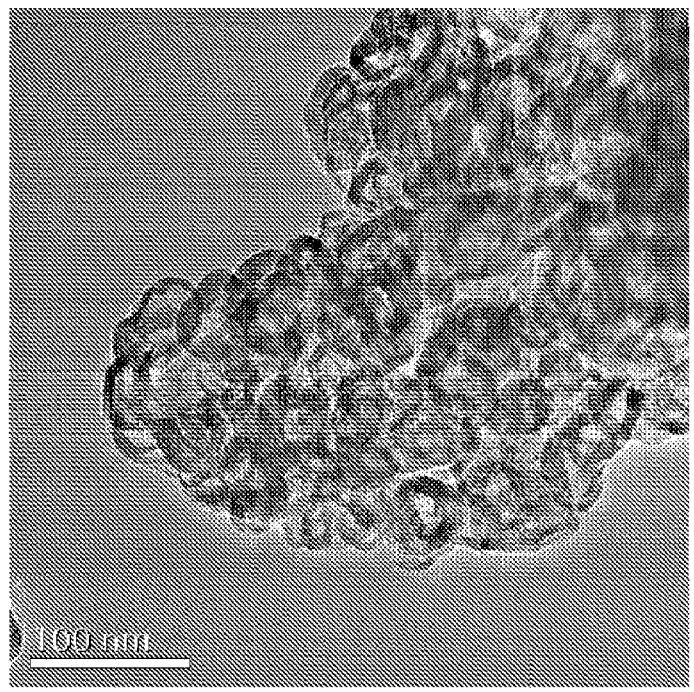
FIG. 2 is a high resolution TEM image of the carbon nanomaterial of FIG. 1A showing a plurality of carbon nanostructures agglomerated together and revealing the multi-walled and hollow nature of the carbon nanostructures that form a cluster.
Figure 3:
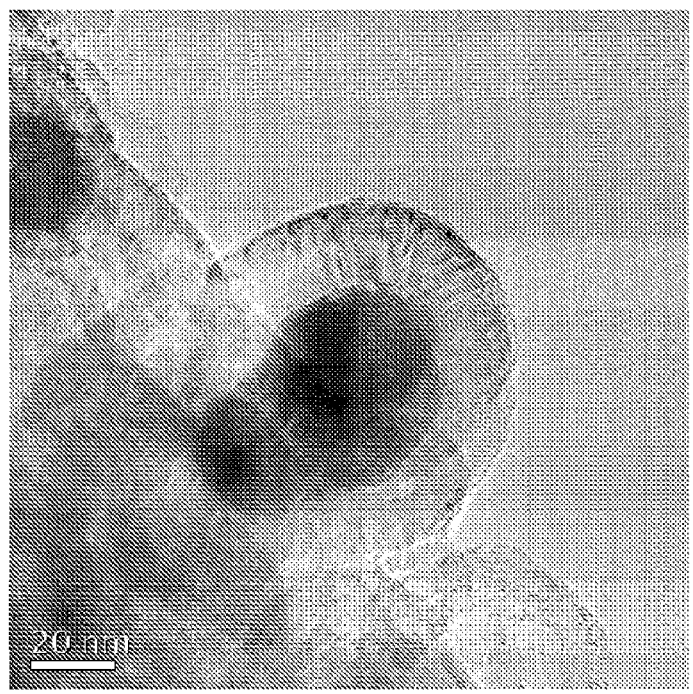
FIG. 3 is a high resolution TEM image showing a close up of a carbon nanostructure that has a catalytic templating nanoparticle in its center.

FIGS. 1A and 1B show SEM images of example nanostructures made according to the present invention, the details of which are described in Example 1 below. FIGS. 2 and 3 are TEM images of the nanomaterial shown in FIGS. 1A and 1B. The TEM images interpreted in light of the SEM images show that in one embodiment the nanostructures can have a generally spheroidal shape.

In FIG. 1A, the SEM image reveals that, at least in some embodiments, the carbon nanomaterial includes spheroidal or "grape-like" clusters of carbon nanostructures. FIG. 1B is a close-up of a cluster of carbon nanostructures that has been partially broken open thereby exposing a plurality of carbon nanostructures. The TEM image in FIG. 2 further shows that the clusters are made up of a plurality of smaller nanostructures. The cluster of nanostructures in FIG. 2 reveals that the nanostructures are hollow and generally spheroidal.

FIG. 3 is an even closer view of a carbon nanostructure that appears to have an iron templating nanoparticle remaining in the center of the carbon nanostructure. The carbon nanostructure of FIG. 3 illustrates that the formation of the carbon nanostructures occurs around the catalytic templating nanoparticles.

In many of the carbon nanostructures observed in TEM images, the outer diameter of the nanostructure is between about 10 nm and about 60 nm and the hollow center diameter is about 10 nm to about 40 nm. However, the present invention includes nanostructures having larger and smaller diameters. Typically, the carbon nanostructures have an outer diameter that is less than about 100 nm to maintain structural integrity.

The thickness of the nanostructure wall is measured from the inside diameter of the wall to the outside diameter of the wall. The thickness of the nanostructure can be varied during manufacture by limiting the extent of polymerization and/or carbonization of the carbon precursor as described above. Typically, the thickness of the carbon nanostructure wall is between about 1 nm and 20 nm. However, thicker and thinner walls can be made if desired. The advantage of making a thicker wall is greater structural integrity. The advantage of making a thinner wall is greater surface area and porosity.

The wall of the carbon nanostructure can also be formed from multiple graphitic layers. In an exemplary embodiment, the carbon nanostructures have walls of between about 2 and about 100 graphite layers, more preferably between about 5 and 50 graphite layers and more preferably between about 5 and 20 graphite layers. The number of graphitic layers can be varied by varying the thickness of the carbon nanostructure wall as discussed above. The graphitic characteristic of the carbon nanostructures is believed to give the carbon nanostructures beneficial properties that are, similar to the benefits of multi-walled carbon nanotubes (e.g. excellent conductivity). They can be substituted for carbon nanotubes and used in many applications where carbon nanotubes can be used but often with predictably superior results.

While the SEM images and TEM images show nanostructures that are generally spherical, the present invention extends to nanostructures having shapes other than spheriodal. In addition, the nanostructures may be fragments of what were originally spheriodal shaped nanostructures.

Typically the shape of the carbon nanostructure will be at least partially determined by the shape of the templating nanoparticles. Thus, formation of non-spherical templating nanoparticles can lead to carbon nanostructures with non-spheroidal dimensions.

In addition to good electron transfer, the carbon nanostructures of the present invention can have high porosity and large surface areas. Adsorption and desorption isotherms indicate that the carbon nanostructures form a mesoporous material. The BET specific surface area of the carbon nanostructures can be between about 80 and about 400 m$^2$/g and is preferably greater than about 120 m$^2$/g, and typically about 200 m$^2$/g, which is significantly higher than the typical 100 m$^2$/g observed for carbon nanotubes. Even where the methods of the invention results in carbon nanostructures combined with non-structured graphite, this graphitic mixture (i.e., the carbon nanomaterial) typically has a surface area greater than carbon nanotubes.

The high surface area and high porosity of the carbon nanostructures manufactured according to the present invention makes the carbon nanostructures useful as a support material for nanoparticle catalysts. Improved diffusion of reactants and/or electrons through the support material improves the efficiency with which substrates and electrons can be transferred to the catalytic surface of the nanoparticles. Consequently, the supported catalysts of the present invention perform better than nanoparticles supported on traditional supports such as carbon black.

Figure 8:
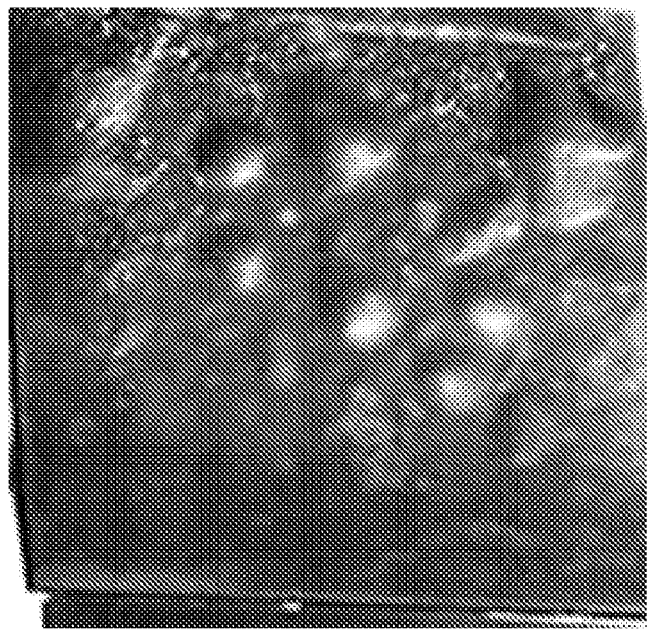
FIG. 8 is an image of a polymer with the purified intermediate carbon material of FIG. 6 incorporated therein.
Figure 9:
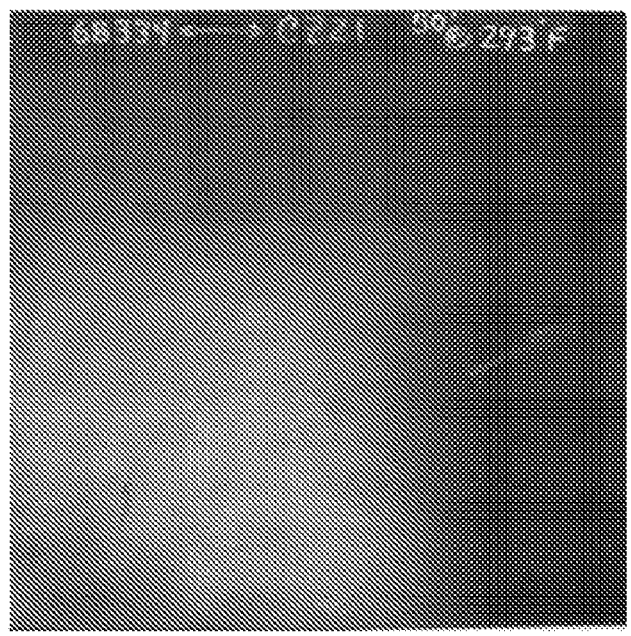
FIG. 9 is an image of a polymer with the carbon nanomaterial of FIG. 7 incorporated therein.

As discussed in U.S. application Ser. No. 11/351,620, filed Feb. 9, 2006, the disclosure of which is incorporate herein, another use for carbon nanostructures manufactured using templating nanoparticles is as a particulate filler material added to a polymeric material (e.g., as a replacement for carbon black or carbon nanotubes). Removing functional groups from the surface of the carbon nanomaterial has a significant impact on the dispersion and surface qualities of polymers incorporating the nanostructures. FIGS. 8 and 9, discussed in more detail with respect to Examples 2 and 3 below, illustrate the beneficial effects of removing functional groups from the carbon nanomaterials. Specifically, the polymer in FIG. 8, which incorporates carbon nanostructures having surface functional groups has significant blistering, while the polymer in FIG. 9, which incorporates carbon nanostructures with functional groups removed does not have blistering.

Preliminary testing of polymeric materials that were filled with carbon nanostructures according to the invention indicates that such filled polymeric materials have substantially reduced surface resistance compared to polymers filled with a comparable quantity of carbon black or carbon nanotubes.

V. Examples

The following examples provide formulas for making carbon nanomaterials containing carbon nanostructures according to the present invention.

Example 1

Example 1 describes the preparation of a carbon nanomaterial having carbon nanospheres.

(a) Preparation of Iron Solution (0.1 M)

A 0.1 M iron solution was prepared by using 84 g iron powder, 289 g of citric acid, and 15 L of water. The iron-containing mixture was mixed in a closed bottle on a shaker table for 3 days, with brief interruptions once or twice daily to purge the vapor space of the bottle with air gas before resuming mixing.

(b) Preparation of Precursor Mixture 916.6 g of resorcinol and 1350 g of formaldehyde (37% in water) were placed to a round bottom flask. The solution was stirred until resorcinol was fully dissolved. 15 L of the iron solution from step (a) was slowly added with stirring, and then 1025 ml of Ammonium hydroxide (28-30% in water) was added drop-wise with vigorous stirring, the pH of the resulted suspension was 10.26. The slurry was cured at 80~90° C. (water bath) for 10 hours. The solid carbon precursor mixture was the collected using filtration and dried in an oven overnight.

(c) Carbonization

The polymerized precursor mixture was placed in a crucible with a cover and transferred to a furnace. The carbonization process was carried out under ample nitrogen flow using the following temperature program: room temperature→1160° C. at a rate of 20° C./min→hold for 5 hrs at 1160° C.→room temperature. The carbonization step yielded an intermediate carbon material having carbon nanostructures, amorphous carbon, and iron.

(d) Purification to Remove Amorphous Carbon and Iron

The purification of the carbonized carbon product (i.e., the intermediate carbon material) was performed as follows: reflux carbonized product in 5M $HNO_3$ for ~12 hrs→rinse with de-ionized (DI)-$H_2O$→treat with a mixture of $KMnO_4$+ $H_2SO_4$+$H_2O$ at a mole ratio of 1:0.01:0.003 (keep at ~90° C. for ~12 hrs)→rinse with DI-$H_2O$→treat with 4M HCl (keep at ~90° C. for ~12 hrs)→rinse with Di-$H_2O$→collect the product and dry in the oven at ~100° C. for two days (e) Heat Treatment to Reduce Surface Functional Groups After the purification procedure, the carbon product went through heat treatment to minimize the surface functional groups and increase the graphitic content. The temperature program that was used for this treatment was as follows: heat from room temperature at 4° C./min→100° C.→hold at 100° C. for 2 hrs→250° C. at 15° C./min→hold for 2 hrs at 250° C.→1000° C. at 15° C./min→hold at 1000° C. for 2 hrs→room temperature. The heat treatment process yielded a carbon nanomaterial primarily composed of carbon nanospheres.

The carbon nanomaterial manufactured in Example 1 was then analyzed by SEM and TEM. The SEM images of the carbon nanostructures are shown in FIG. 1A and 1B, which reveal a plurality of carbon nanospheres that agglomerate to form a cluster that has a grape-like shape. The TEM images in FIGS. 2 and 3 show that the grape-like clusters are made up of a plurality of small, hollow graphitic nanostructure or carbon nanospheres.

Figure 4:
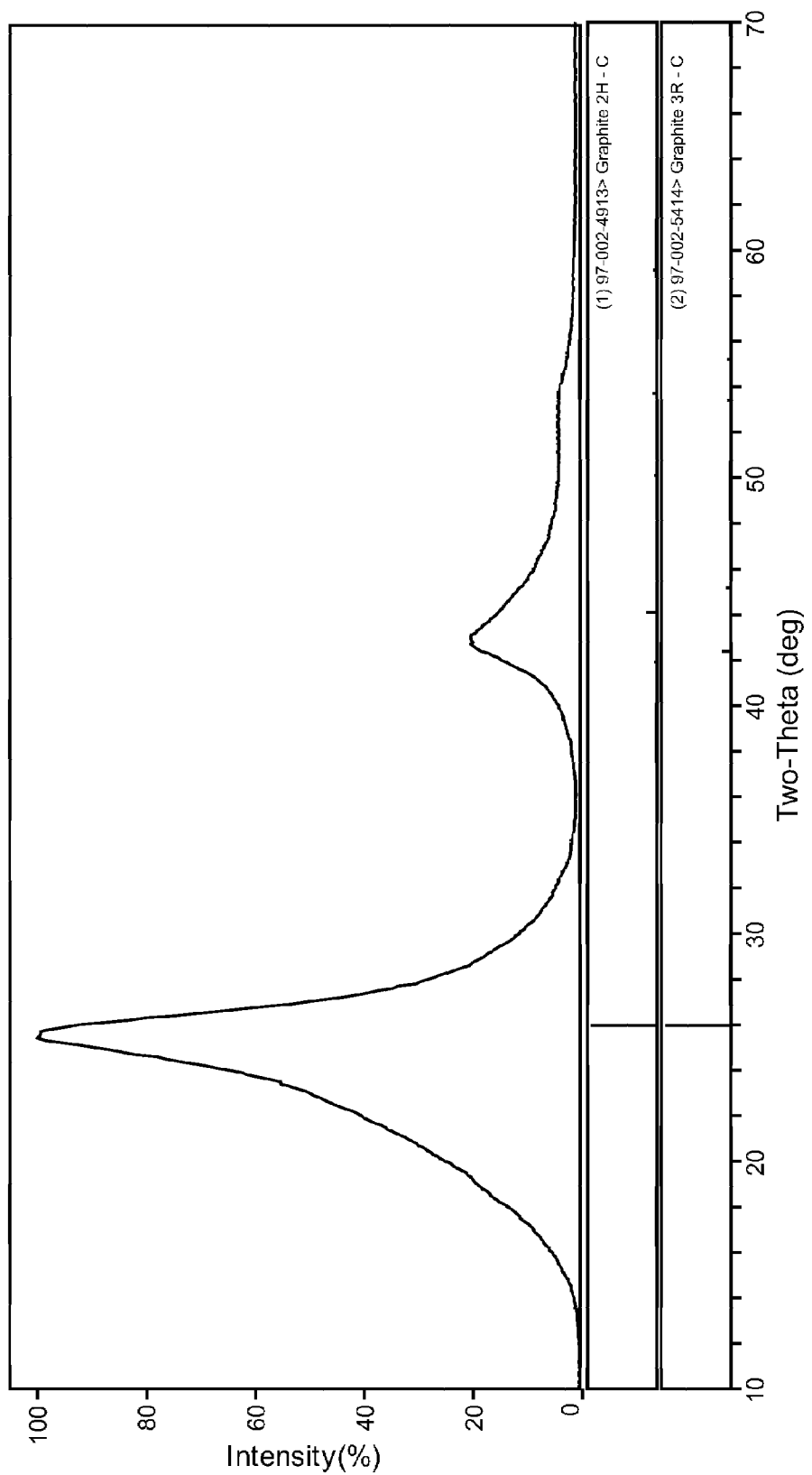
FIG. 4 shows the intensity of x-ray diffraction of the carbon nanomaterial of FIG. 1A.

The carbon nanostructures of Example 1 were tested for graphitic content using X-ray diffraction. FIG. 4 is a graph showing the X-ray diffraction pattern of the carbon nanomaterial of Example 1. The broad peak at about 26° is due to the short range order of graphitic nanostructures. This is in contrast to the typical diffraction pattern of graphite sheets, which tend to have a very narrow peak. The broad peak at about 26° also suggests that the material is graphitic, since amorphous carbon tends to have a diffraction peak at 20°.

Figure 5:
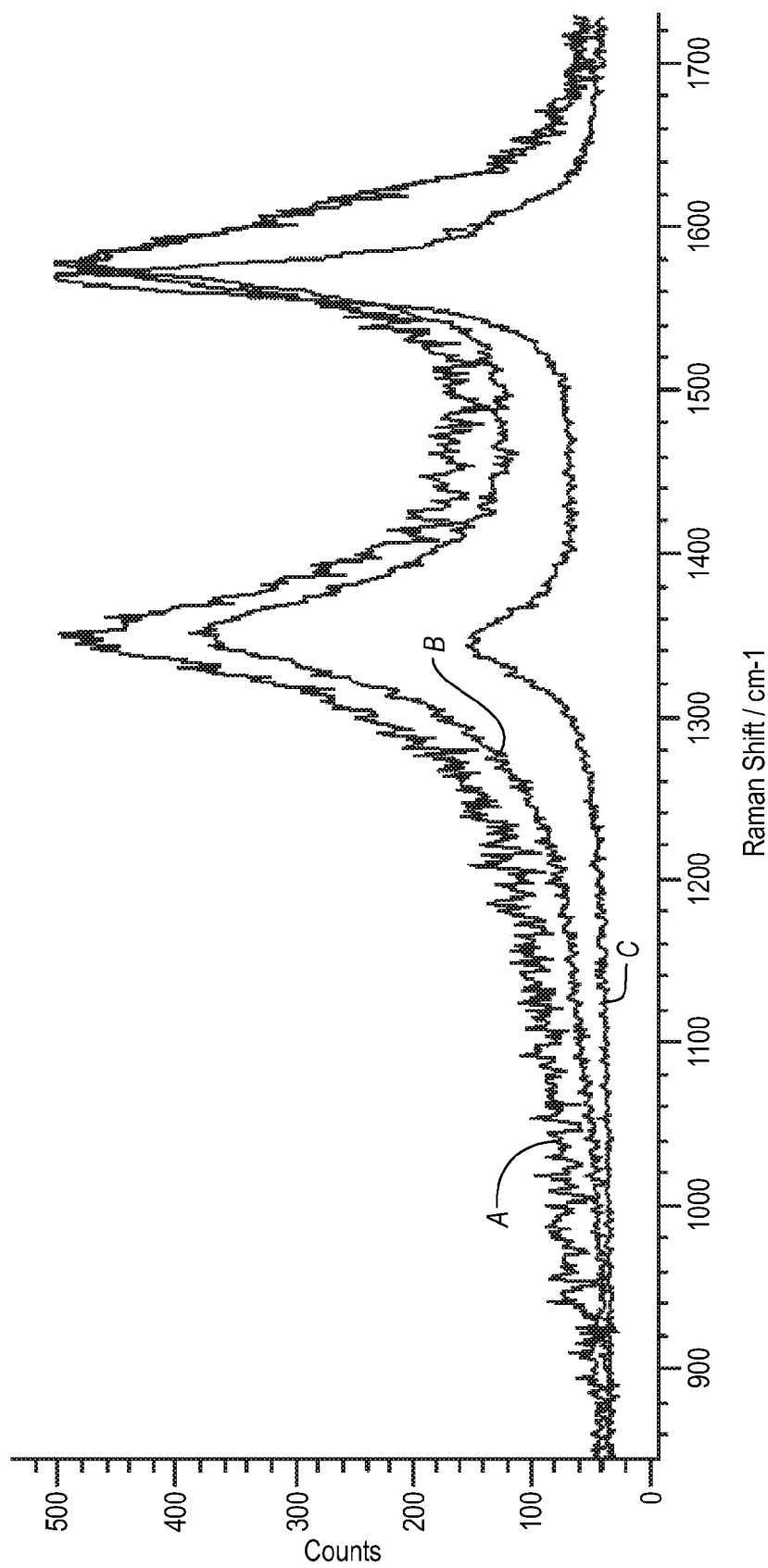
FIG. 5 is a graph showing the Raman spectra of a carbon nanomaterial manufactured according to the present invention and showing differences in the carbon nanomaterial as a result of different heat treatments.

Raman spectroscopy was used to determine the graphitic content of the carbon nanomaterial at different temperatures during the heat treating step (e). Sample A was taken from the carbon nanomaterial at a heat treated temperature of 1000° C., Sample B was taken during heat treating to 600° C., and Sample C was a sample with no heat treating (i.e., Sample C was the purified intermediate carbon material of step (d)). The results for Raman Spectroscopy are shown in FIG. 5. The graph in FIG. 5 has two significant peaks, one at 1354 and the other at 1581. As shown in the graph, Sample A and B, which were heat treated, have larger peaks at 1354. These peaks indicate that the amorphous carbon is graphitic and therefore is not burnt off (i.e., there is less mass loss). In contrast, the peak at 1354 for Sample C shows significant mass loss, which is indicative of non-graphitic amorphous carbon. Thus, in addition to removing functional groups, the heat treatment step is effective for increasing the graphitic content of any remaining carbon. Surprisingly this conversion can happen at relatively low temperatures, for example, between 500° C. and 1400° C.

The higher graphitic content of carbon nanomaterial manufactured according to the present invention using an additional heat treatment step results in a carbon nanomaterial with superior conductive properties and purity. In addition to improving the graphite concentration, heat treating was also shown to substantially reduce other impurities such as iron.

Example 2

Example 2 describes a carbon nanomaterial manufactured using the same method as Example 1, except that in step (e) the heat treatment step was replaced with a treatment using a neutralizing base.

A portion of the purified carbon material obtained in step (d) of Example (1) was mixed with ample amount of DI-H2O, followed by drop-wise addition of 5M NaOH to adjust the pH of the solution to ~7.0. The resulting carbon nanomaterial was collected by filtration and rinsed with ample amount of DI-H2O to remove $Na^+$ ions. The final product was collected and dry in an oven at ~100° C. for two days.

Example 3

Comparative Example

For comparison purposes, a portion of the purified carbon material obtained in step (d) of Example 1 was collected and was not subject to the heat treatment step described in step (e) of Example 1, nor was it subjected to a neutralizing base as in Example 2.

Figure 6:
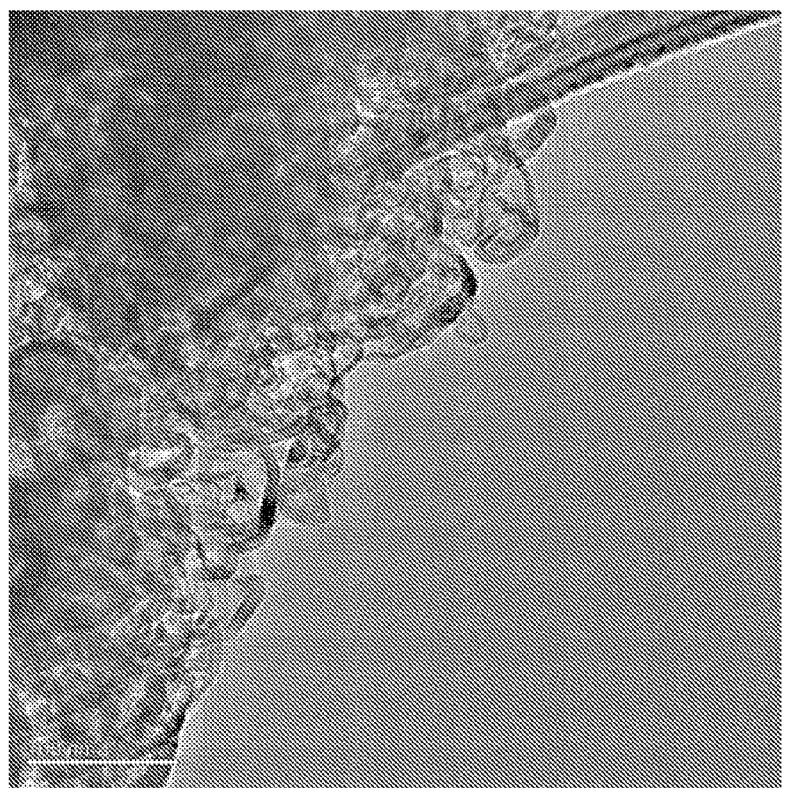
FIG. 6 is a high resolution TEM of a purified intermediate carbon material manufactured according to the invention, but that has not been treated to remove functional groups.
Figure 7:
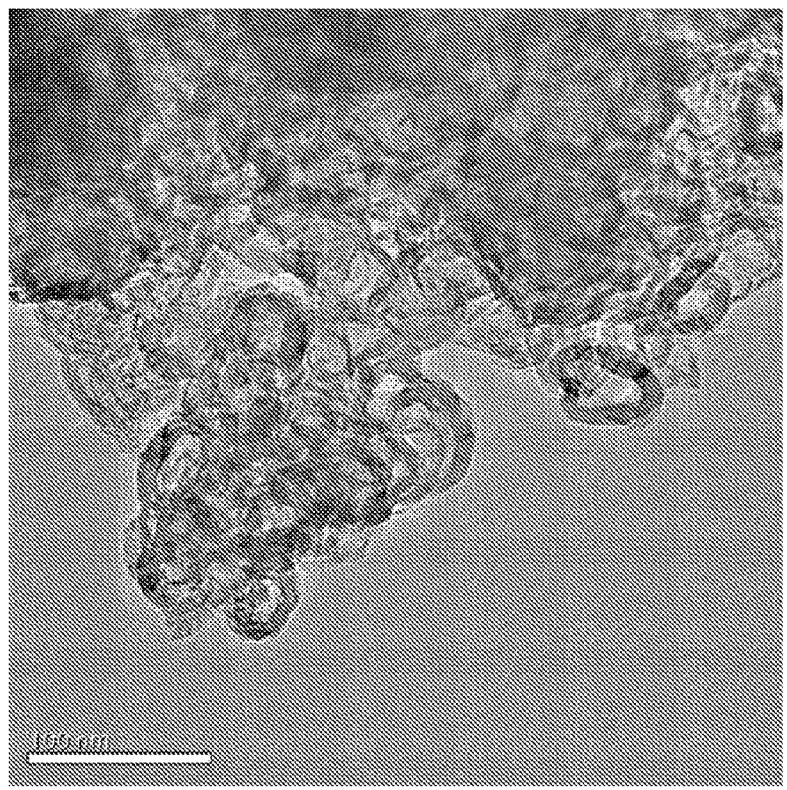
FIG. 7 is a high resolution TEM of the carbon nanomaterial of FIG. 6 that has been treated with a base to remove functional groups.

TEM images of the carbon nanostructures of Examples 2 and 3 were obtained to determine if any structural changes occur during the neutralizing step. FIG. 7, which is a TEM of the carbon material of Example 2 (i.e., after neutralization), shows no deleterious effects on the carbon nanostructures when compared to FIG. 6, which is a TEM of the carbon material of Example 3 (i.e., before neutralization).

The beneficial properties of the acid-free carbon nanomaterial of Example 2 can be illustrated by incorporating the acid-free nanomaterial into a polymer and comparing it to polymers that include nanomaterials that are identical except for the presence of acid functional groups. To test this scenario, the carbon nanomaterials of Examples 2 and 3 where separately mixed with a polymer. FIGS. 8 shows the polymer with the carbon nanomaterial having acid functional groups. This polymer shows significant blistering and irregularities on its surface. In contrast, the polymer that includes the neutralized carbon nanomaterials of Example 2 show a smooth surface.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for manufacturing a carbon nanomaterial, comprising:
   forming a precursor mixture comprising a carbon precursor and a plurality of templating nanoparticles, the templating nanoparticles comprising a catalytic metal;
   causing or allowing the carbon precursor to polymerize around the catalytic templating nanoparticles to form a polymerized carbon precursor material;
   carbonizing the polymerized carbon precursor material to form an intermediate carbon material comprising a plurality of carbon nanostructures, amorphous carbon, and optionally remaining catalytic metal;
   purifying the intermediate carbon material by removing at least a portion of the amorphous carbon and optionally a portion of any remaining catalytic metal, wherein the purified intermediate carbon material has a plurality of functional groups on the surface thereof; and
   removing at least a portion of the functional groups from the surface of the purified intermediate carbon material by at least one of:
   (i) heating the purified intermediate carbon material to a temperature greater than about 100° C.; and/or
   (ii) treating the purified intermediate carbon material with a base,
   the carbon nanomaterial comprising carbon nanostructures having a BET specific surface area greater than about 120 $m^2/g$,
   the carbon nanomaterial comprising a plurality of carbon nanospheres, each nanosphere comprising a multi-walled outer structure and a center that is hollow or filled with a catalytic templating particle.

2. A method as in claim 1, in which the purified intermediate carbon material is heated to a temperature greater than about 200° C.

3. A method as in claim 1, in which the purified intermediate carbon material is heated to a temperature greater than about 500° C.

4. A method as in claim 1, in which the purified intermediate carbon material is heated to a temperature greater than about 1000° C.

5. A method as in claim 1, in which the purified intermediate carbon material is treated with an aqueous base selected from the group consisting of sodium hydroxide, potassium hydroxide, ammonia, Li-acetate, Na-acetate, K-acetate, $NaHCO_3$, $KHCO_3$, $Na_2CO_3$, $K_2CO_3$, and combinations thereof.

6. A method as in claim 1, in which the purified intermediate carbon material is treated with sufficient base such that a washing solution with a 1:1 weight ratio of washing solution to carbon nanomaterial has a pH that is in a range from about 5.0 to about 8.0.

7. A method as in claim 1, in which the purified intermediate carbon material is treated with sufficient base such that a washing solution with a 1:1 weight ratio of washing solution to carbon nanomaterial has a pH that is in a range from about 6.0 to about 7.5.

8. A method as in claim 1, in which the templating nanoparticles are formed in the carbon precursor.

9. A method as in claim 1, in which the templating nanoparticles are formed prior to mixing with the carbon precursor to form the precursor mixture.

10. A method as in claim 1, in which the templating nanoparticles are prepared by,
   (a) reacting a plurality of precursor catalyst atoms with a plurality of organic dispersing agent molecules to form complexed catalyst atoms; and
   (b) allowing or causing the complexed catalyst atoms to form the templating nanoparticles.

11. A method as in claim 1, in which the catalytic templating nanoparticles comprise one or more of iron, cobalt, or nickel.

12. A method as in claim 1, in which the carbon nanomaterial comprises carbon nanospheres.

13. A method as in claim 1, in which the intermediate carbon material is purified by removing at least a portion of the residual catalytic metal.

14. A method as in claim 13, in which the residual catalytic metal is removed by etching with an acid.

15. A method as in claim 1, in which the amorphous carbon is removed using an oxidizing agent.

16. A method as in claim 15, wherein the oxidizing agent is $KMnO_4$.

17. A method for manufacturing a carbon nanomaterial, comprising:
   forming a precursor mixture comprising a carbon precursor and a plurality of templating nanoparticles, wherein the templating nanoparticles are formed by:
   (a) reacting a plurality of precursor catalyst atoms with a plurality of organic dispersing agent molecules to form complexed catalyst atoms; and (b) allowing or causing the complexed catalyst atoms to form the templating nanoparticles;

causing or allowing the carbon precursor to polymerize around the catalytic templating nanoparticles to form a polymerized carbon precursor material;

carbonizing the polymerized carbon precursor material to form an intermediate carbon material comprising a plurality of carbon nanostructures, amorphous carbon, and catalytic metal;

purifying the intermediate carbon material by removing at least a portion of the amorphous carbon and optionally a portion of remaining catalytic metal, wherein the purified intermediate carbon material has a plurality of functional groups on the surface thereof; and heating the purified intermediate carbon material to a temperature greater than about 100° C. to remove at least a portion of the functional groups and yield the carbon nanomaterial, the carbon nanomaterial comprising carbon nanostructures having a BET specific surface area greater than about 120 m$^2$/g.

18. A method as in claim 17, in which the purified intermediate carbon material is heated to a temperature greater than about 200° C.

19. A method as in claim 17, in which the purified intermediate carbon material is heated to a temperature greater than about 500° C.

20. A method as in claim 17, in which the purified intermediate carbon material is heated to a temperature greater than about 1000° C.

21. A method as in claim 17, in which the purified intermediate carbon material is treated with an aqueous base selected from the group consisting of sodium hydroxide, potassium hydroxide, ammonia, Li-acetate, Na-acetate, K-acetate, $NaHCO_3$, $KHCO_3$, $Na_2CO_3$, $K_2CO_3$, and combinations thereof.

22. A method as in claim 17, the carbon nanomaterial comprising a plurality of carbon nanostructures which have an increased weight percent of graphitic content as compared to a carbon nanomaterial manufactured without heating the purified intermediate carbon material.

23. A method as in claim 1, wherein the carbon nanomaterial is substantially free of acid functional groups.

24. A method as in claim 1, the precursor mixture having a molar ratio of carbon precursor to catalyst metal atoms in a range of about 1:1 to about 30:1.

25. A method as in claim 1, wherein forming the precursor mixture further comprises causing or allowing the carbon precursor to polymerize around the templating nanoparticles prior to carbonizing the precursor mixture to form the intermediate carbon material.

26. A method as in claim 17, the precursor mixture having a molar ratio of carbon precursor to catalyst metal atoms in a range of about 1:1 to about 30:1.

27. A method for manufacturing a carbon nanomaterial, comprising:

forming a precursor mixture comprising a carbon precursor and a plurality of catalytic templating nanoparticles, the templating nanoparticles being formed by:
(a) reacting a plurality of precursor catalyst atoms with a plurality of organic dispersing agent molecules to form complexed catalyst atoms; and
(b) allowing or causing the complexed catalyst atoms to form the catalytic templating nanoparticles,
wherein the precursor mixture initially has a molar ratio of carbon precursor to catalyst metal atoms in a range of about 0.1:1 to about 100:1;

causing or allowing the carbon precursor to polymerize around the catalytic templating nanoparticles;

carbonizing the precursor mixture to form an intermediate carbon material comprising a plurality of carbon nanostructures, amorphous carbon, and catalytic metal;

purifying the intermediate carbon material by removing at least a portion of the amorphous carbon and optionally a portion of remaining catalytic metal, wherein the purified intermediate carbon material has a plurality of functional groups on the surface thereof, the functional groups being selected from the group consisting of carboxylic acids, hydroxyl groups, and hydronium groups; and removing at least a portion of the functional groups from the surface of the purified intermediate carbon material by at least one of:
(i) heating the purified intermediate carbon material to a temperature greater than about 100° C.; and/or
(ii) treating the purified intermediate carbon material with an aqueous base.

28. A method for manufacturing a carbon nanomaterial, comprising:

forming a precursor mixture comprising a carbon precursor and a plurality of templating nanoparticles, the templating nanoparticles comprising a catalytic metal and being formed in the carbon precursor;

causing or allowing the carbon precursor to polymerize around the catalytic templating nanoparticles to form a polymerized carbon precursor material;

carbonizing the polymerized carbon precursor material to form an intermediate carbon material comprising a plurality of carbon nanostructures, amorphous carbon, and optionally remaining catalytic metal;

purifying the intermediate carbon material by removing at least a portion of the amorphous carbon and optionally a portion of any remaining catalytic metal, wherein the purified intermediate carbon material has a plurality of functional groups on the surface thereof; and removing at least a portion of the functional groups from the surface of the purified intermediate carbon material by at least one of:
(i) heating the purified intermediate carbon material to a temperature greater than about 100° C.; and/or
(ii) treating the purified intermediate carbon material with a base, the carbon nanomaterial comprising carbon nanostructures having a BET specific surface area greater than about 120 m$^2$/g.

29. A method for manufacturing a carbon nanomaterial, comprising:

forming a precursor mixture comprising a carbon precursor and a plurality of catalytic templating nanoparticles, the templating nanoparticles being formed by:
(a) reacting a plurality of precursor catalyst atoms with a plurality of organic dispersing agent molecules to form complexed catalyst atoms; and
(b) allowing or causing the complexed catalyst atoms to form the catalytic templating nanoparticles,
the precursor mixture having a molar ratio of carbon precursor to catalyst metal atoms in a range of about 0.01:1 to about 100:1;

causing or allowing the carbon precursor to polymerize around the catalytic templating nanoparticles to form a polymerized carbon precursor material;

carbonizing the polymerized carbon precursor material to form an intermediate carbon material comprising a plurality of carbon nanostructures, amorphous carbon, and optionally remaining catalytic metal;

purifying the intermediate carbon material by removing at least a portion of the amorphous carbon and optionally a portion of any remaining catalytic metal, wherein the purified intermediate carbon material has a plurality of functional groups on the surface thereof; and removing at least a portion of the functional groups from the surface of the purified intermediate carbon material by at least one of:
(i) heating the purified intermediate carbon material to a temperature greater than about 100° C.; and/or
(ii) treating the purified intermediate carbon material with a base, the carbon nanomaterial comprising carbon nanostructures having a BET specific surface area greater than about 120 $m^2/g$.

* * * * *

UNITED STATES PATENT AND TRADEMARK OFFICE
CERTIFICATE OF CORRECTION

PATENT NO.        : 7,718,156 B2                                                Page 1 of 3
APPLICATION NO. : 11/614011
DATED             : May 18, 2010
INVENTOR(S)       : Zhang et al.

It is certified that error appears in the above-identified patent and that said Letters Patent is hereby corrected as shown below:

Title Page

Item 56, OTHER PUBLICATIONS, Page 1, Right Hand Column, change "Sun et al., "Colloidal Carbon Spheres and Their Core/Shell Structures with Noble-Metal Nanoparticles", Angewandte Chemie International Edition, Wiley-VCH Verlag GmbH & Co. KGaA, 2004, vol. 43, Issue 5, pp. 597-6501." to --Sun et al., "Colloidal Carbon Spheres and Their Core/Shell Structures with Noble-Metal Nanoparticles", Angewandte Chemie International Edition, WILEY-VCH Verlag GmbH & Co. KGaA, 2004, vol. 43, Issue 5, pp. 597-6501.--

Item 56, OTHER PUBLICATIONS, Page 2, Left Hand Column, change "Garrigue et al., "Top-Done Approach for the Preparation of Colloidal Carbon Nanoparticles", Chemical Materials 2004, 16, 2984-2986, available online Jul. 17, 2007." to --Garrigue et al., "Top-Down Approach for the Preparation of Colloidal Carbon Nanoparticles", Chemical Materials 2004, 16, 2984-2986, available online Jul. 17, 2007.--

Item 56, OTHER PUBLICATIONS, Page 2, Right Hand Column, change "Ohtsuka, Yasui, et al., "Char-Nitrogen Functionality and Interactions Between the Nitrogen and Iron I the Iron-Catalyzed Conversion Process of Coal Nitrogen to $N_2$," Research Center for Organic Resources and Materials Chemistry, Institute for Chemical Reaction Science, Tohoku University, Sendai, Japan, pp. 1356-1362 (May 6, 2998)." to --Ohtsuka, Yasui, et al., "Char-Nitrogen Functionality and Interactions Between the Nitrogen and Iron in the Iron-Catalyzed Conversion Process of Coal Nitrogen to $N_2$," Research Center for Organic Resources and Materials Chemistry, Institute for Chemical Reaction Science, Tohoku University, Sendai, Japan, pp. 1356-1362 (May 6, 2998).--

Item 56, OTHER PUBLICATIONS, Page 2, Right Hand Column, change "Han, Sangjin, et al., "Simple Solid-Phase Synthesis of Hollow Graphitic Nanoparticles and their Appliation to Direct Methanol Fuel Cell Electrodes," *Adv. Mater.* 2003, 15, No. 22, Nov. 17, pp. 1922-1925." to --Han, Sangjin, et al., "Simple Solid-Phase Synthesis of Hollow Graphitic Nanoparticles and their Application to Direct Methanol Fuel Cell Electrodes," *Adv. Mater.* 2003, 15, No. 22, Nov. 17, pp. 1922-1925.--

Signed and Sealed this

Twenty-eighth Day of September, 2010

David J. Kappos
*Director of the United States Patent and Trademark Office*

Column 1
Line 33, after "with" insert --a--
Line 65, change "have" to --has--

Column 2
Line 38, after "Alternatively" insert --,--
Line 62, after "thereof" insert --,--

Column 3
Line 1, change "FIGS. 1A" to --FIG. 1A--
Line 5, change "high resolution, SEM image" to --high resolution SEM image--
Line 17, change "FIG. 4 shows" to --FIG. 4 is a graph showing--
Line 52, change "and" to --an--
Line 64, change "irregularly shaped multi-walled," to --irregulary shaped, multi-walled,--

Column 4
Line 1, change "SEM images but" to --SEM images, but--
Line 2, change "hollow multi-walled" to --hollow, multi-walled--

Column 5
Line 13, change "polymers 1and oligomers" to --polymers and oligomers--
Lines 16-17, change "Van der Waals" to --van der Waals--
Line 59, after "polypyridine," insert --and--

Column 6
Line 1, after "metal ion" insert --,--
Line 45, change "less than, 5 wt %" to --less than 5 wt %--
Line 55, change "easy" to --easily--

Column 7
Line 11, change "sodium, hydroxide" to --sodium hydroxide--

Column 8
Line 11, after "some cases" insert --,--
Line 21, after "embodiment" insert --,--
Line 55, after "embodiment" insert --,--

Column 9
Line 11, change "and:" to --and--
Line 37, after "Optionally" insert --,--
Line 62, after "In some cases" insert --,--

Column 10
Line 42, change "heat treatment, step" to --heat treatment step--

Column 11
Line 59, after "embodiment" insert --,--
Line 65, after "open" insert --,--

CERTIFICATE OF CORRECTION (continued)
U.S. Pat. No. 7,718,156 B2

Column 12
Line 35, change "are, similar" to --are similar--
Lines 42-44, change both instances of "spheriodal" to --spheroidal--
Line 59, change "results" to --result--

Column 13
Line 7, change "incorporate" to --incorporated--
Line 21, after "removed" insert --,--
Line 50, change "Ammonium hydroxide" to --ammonium hydroxide--
Line 54, remove [the]

Column 14
Line 26, change "Example 1" to --Example 1--
Line 44, change "Sample A and B" to --Samples A and B--

Column 15
Lines 2 and 6, change "DI-H2O" to --DI-$H_2$O--
Line 5, change "amount" to --amounts--
Line 29, change "where" to --were--